UNITED STATES PATENT OFFICE.

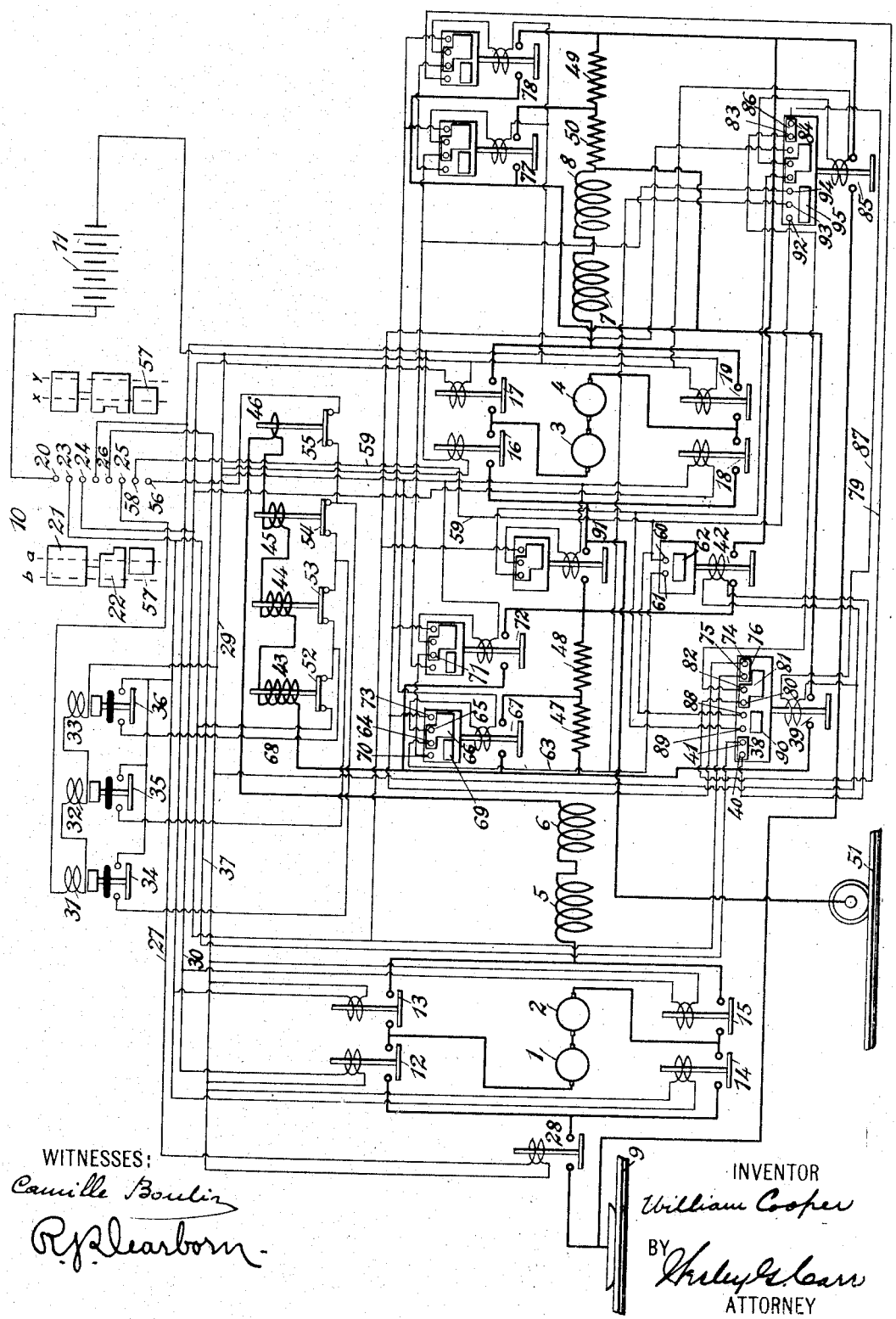

WILLIAM COOPER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-MOTOR CONTROL.

No. 873,298.   Specification of Letters Patent.   Patented Dec. 10, 1907.

Application filed March 3, 1906. Serial No. 304,063.

*To all whom it may concern:*

Be it known that I, WILLIAM COOPER, a citizen of the United States, and a resident of Wilkinsburg, in the county of Allegheny and State of Pennsylvania, have invented a new and useful Improvement in Electric-Motor Control, of which the following is a specification.

My invention relates to control systems for electric motors and has special reference to such systems as embody means for effecting automatic acceleration of motors.

The object of my invention is to provide, in a system of the class above indicated, adjustable means for retarding the accelerating action that shall be dependent upon a predetermined value of electric current flowing in the motor circuit and means for varying said current value at the will of the attendant.

In the operation of variable speed motors, such as are employed for electric railway vehicle service, it has been found desirable and economical to employ a system of automatic acceleration which has usually comprised a plurality of switches so interlocked as to confine their operation to a predetermined sequence. With such an arrangement it is advisable to use a device for preventing the closure of each accelerating switch until the current flowing in the motor circuit falls below a predetermined value, in order that the motors may not be injured by increasing the applied voltage too rapidly. A common form of such a device comprises a magnet coil which is connected in series with the motor circuit and a switch to be actuated thereby, and adapted to interrupt the circuit which supplies energy for operating the accelerating switches. Devices of this character have proved satisfactory when the load on the motor equipment at starting has been approximately constant, as in a single motor vehicle or in a train of vehicles each of which is supplied with an adequate motor equipment; but in control systems for electric locomotives which may be called upon to haul variable loads that are dependent upon the length and character of the train, it is desirable to provide means for adjusting the predetermined current value at which the limiting device will operate in order that the time consumed in accelerating may be kept substantially constant for all loads. This result may be accomplished by providing means for varying the number of turns included in series with the motor circuit at any one time but, since relatively large currents flow through the motor circuit, I have provided, by my present invention, means for adequately controlling the action of the limiting device from the auxiliary circuits which are traversed by relatively small currents.

The single figure of the accompanying drawing is a diagrammatic view of a control system embodying my invention, and the limiting device shown therein comprises a plurality of switches having dissimilar actuating coils, all of which are connected in series relation with the motor circuit.

Referring to the drawing, a plurality of electric motors comprising armatures 1, 2, 3 and 4 and field magnet windings 5, 6, 7 and 8, are supplied with energy from a line conductor 9, the motor circuit connections being determined by a plurality of electrically operated switches. The action of these switches is determined by a master controller 10 which is adapted to occupy a plurality of positions $a$, $b$, $x$ and $y$ and through which energy may be supplied to the actuating coils of the switches from a battery 11.

The direction of rotation of the armatures of the several motors is determined by a plurality of reversing switches 12, 13, 14, 15, 16, 17, 18 and 19.

When the master controller 10 passes from its "off" position to the position $a$, in which automatic acceleration is permitted, energy is supplied from the battery 11 through a contact finger 20 to contact ring segments 21 and 22, which are first engaged by a plurality of fingers 23, 24 and 25, the contact ring segment 22 being finally engaged by contact finger 26. From the contact finger 23, energy is supplied through conductor 27 to the actuating coil of a switch 28, and the circuit is completed from this point through a conductor 29 which is connected to the negative terminal of the battery 11. From the contact finger 24 energy is supplied through a conductor 30 to the actuating coils of switches 12, 15, 17 and 18, which determine the direction of rotation of the motors, a circuit being similarly completed from each one of these coils to the negative conductor 29. Energy is supplied from contact finger 25 to a plurality of holding coils 31, 32 and 33 which are connected in series relation between the contact finger and the negative line conductor 29. These coils, when energized, are adapted to hold a series of switches 34, 35 and 36 in a closed position after they have been moved into such position by hand or otherwise.

Energy is supplied from the contact finger 26 through a conductor 37 and through a bridging contact member 38, which is located on a switch 39 and is engaged by a pair of contact fingers 40 and 41, when said switch is in its open circuit position, to an actuating coil of a switch 42, from which point the circuit is completed to the negative battery conductor 29. By reason of the energizing of the aforesaid actuating coils, the switches 28, 12, 15, 17, 18 and 42 are closed and, consequently, the circuit is completed from the line terminal 9 through switches 28 and 12, armatures 1 and 2, switch 15, field magnet windings 5 and 6, a plurality of dissimilar magnet coils 43, 44, 45 and 46, resistance sections 47 and 48, switch 42, resistance sections 49 and 50, field magnet windings 8 and 7, switch 17, armatures 3 and 4 and switch 18 to an opposite line conductor 51. Thus, it will be observed, the motors are first connected in series relation with resistance sections 47, 48, 49 and 50 included in circuit therewith.

When the switch 42 is first closed the current flowing in the motor circuit is usually sufficient to open part or all of a plurality of switches 52, 53, 54 and 55 which are actuated, respectively, by the magnet coils 43, 44, 45 and 46, and, as the counter electromotive force increases with the speed, the switch 55 is first closed, since its actuating coil 46 comprises fewer convolutions than the coils of switches 54, 53 and 52, which close consecutively thereafter, as the current flowing in the circuit falls below the predetermined amount at which each switch is adapted to operate.

When the switches 34, 35 and 36 are open, a circuit connection is completed from the conductor 27 through switches 52, 53, 54 and 55, contact finger 56 of the master switch 10, contact ring segment 57, contact finger 58, conductor 59, contact fingers 60 and 61, which are engaged by a bridging contact member 62 when the switch 42 is closed, conductor 63, contact fingers 64 and 65, which are engaged by a bridging contact member 66 when a switch 67 is open, and through the actuating coil of the switch 67 to the negative line conductor 29.

It will be observed that when the switches 34, 35 and 36 are open the switch 67 cannot be closed to short-circuit the resistance section 47 until the switches 55, 54, 53 and 52 are all closed. If, however, the load on the vehicle is such that it is desirable to accelerate the motors more rapidly, the switch 36 may be closed by the attendant. It will be held in this position, as hereinbefore explained, by the energizing of the coil 33, whereupon energy will be supplied from the conductor 27 through the switch 36 and conductor 68 to a point between the switches 52 and 53, so that energy may be supplied to the actuating coil of switch 67. In this way, the switch 67 may be closed irrespective of the closing of the switch 52 and, since the actuating coil 43 of the switch 52 contains a greater number of convolutions than any one of the coils 44, 45 and 46, the resistance section 47 may be short-circuited when the current traversing the motor circuit is at a higher value than the maximum current value at which the acceleration would proceed if the switch 36 were open. In a similar manner, the resistance section 47 may be short-circuited at a still higher value of current in the motor circuit by closing the switches 35 and 34, which, in turn, short-circuit the switches 53 and 54. In each instance, the maximum current value at which the limiting device will permit the acceleration to proceed is a little higher than that which permitted such procedure when a coil of a greater number of convolutions governed the accelerating circuits.

When the switch 67 is closed, the contact finger 64 is disengaged from the bridging contact member 66 and moves into engagement with contact member 69, which is also engaged by a contact finger 70, so that the accelerating circuit is now continued from the finger 64, through the contact member 69 and contact finger 70 to a contact finger 71 of a switch 72, to short-circuit the resistance section 48. The contact finger 65 of the switch 67 still engages contact member 66, now also engaged by contact finger 73 which is supplied with energy directly from the conductor 27 through contact fingers 74 and 75 that are engaged by a bridging contact member 76 when the switch 39 is open. In this way, the switch 67, after being closed, is held in this position, irrespective of the limiting device, since its operating coil is now supplied with energy directly from the positive battery terminal through the master controller. The steps involved in the closure of the switch 67 are repeated for the switch 72 and for a plurality of switches 77 and 78 which are adapted to short-circuit resistance sections 50 and 49, the first step in the operation of each switch being dependent upon the limiting device. When switch 78 is closed, the motors are connected across the line without a resistance included in the circuit. The switch 39 is next closed, energy being supplied to its actuating coil through a conductor 79, contact finger 80, bridging contact member 81, contact finger 82, contact fingers 83 and 84 of a switch 85, which are engaged by a bridging contact member 86 when said switch is open, conductor 87 and, through the actuating coil of the switch 39, to the negative battery conductor 29.

As soon as the switch 39 is closed, the actuating magnet of the switch 42 becomes deenergized by reason of the dis-engagement of the contact fingers 40 and 41 from the bridging contact member 38. Furthermore, contact fingers 74 and 75 become dis-engaged from the bridging contact member 76 so that the circuit which has supplied energy for holding the switches 67, 72, 77 and 78 closed, is interrupted, and the switches are opened. The motor circuit is now completed, from the coils 43, 44, 45 and 46, through switch 39 to field magnet winding 8 so that the circuit connection of the motor remains the same, except that a single shunt short-circuits the sections of resistance, instead of the several shunts hereinbefore described.

When the switch 42 is opened, contact fingers 60 and 61 are dis-engaged from bridging contact member 62. The circuit from the conductor 59 is now continued through contact fingers 88 and 89, which have moved into engagement with a bridging contact member 90, and energy is supplied to operate a switch 91 and also to operate switch 85, the actuating coils of both of which are immediately transferred from the accelerating circuit to a holding circuit which is independent of the limiting device.

As soon as the switch 85 is closed, the contact fingers 83 and 84 become dis-engaged from the bridging contact member 86 so that the actuating coil of the switch 39 is deenergized which permits this switch to open. Circuit is now completed from the line conductor 9 through armatures 1 and 2, field magnet windings 5 and 6 as before, circuit being completed from this point through the several coils of the limiting device, resistance sections 47 and 48, and switch 91 to the opposite line conductor 51. Energy is also supplied from the line conductor 9 through switch 85, resistance sections 49 and 50, field magnet windings 8 and 7 and armatures 3 and 4 to the opposite line conductor 51. Thus the four motors are connected, two in series, in parallel circuits. When the switch 85 is closed, a plurality of contact fingers 92, 93 and 94 move into engagement with a bridging contact member 95, so that energy is now supplied to finger 64 of the switch 67 and also to the corresponding contact finger of the switch 77. In this way, the switches 67 and 77 are simultaneously closed as soon as the current traversing the motor circuits falls below a predetermined value, as determined by the limiting device, and a closure of these two switches effects suitable connections for closing the switches 72 and 78, as soon as the current traversing the motor circuits again falls below a predetermined value. In this way, the resistance included in each of the multiple circuits containing the pairs of motors is simultaneously decreased to zero and the motors are now connected directly across the line without resistance in circuit.

When the controller 10 occupies the position $x$ circuits are established similar to those which correspond to the position $a$ except that, instead of the reversing switches 12, 15, 17 and 18 being closed, the switches 13, 14, 16 and 19 are closed so that the current traversing the motor circuit passes through the armatures of the several motors in the opposite direction. If it is desirable, at any stage of the acceleration of the motors, to prevent an increase in the speed of the vehicle, the master controller 10 may be moved from the position $a$ to the position $b$ or from the position $x$ to the position $y$ as the case may be, in which positions the contact fingers 56 and 58 become disengaged from the contact ring segments 57 and it is impossible to supply energy to the conductor 59 from which the actuating coils of the several switches first receive their energy. The switches already closed, however, will be retained in such position since all the other circuits are uninterrupted.

If it is desirable to stop the equipment or to interrupt the supply of energy to the motors, the controller 10 may be moved to the "off" position, when all the switches will be open and the holding coils 31, 32 and 33 of the switches 34, 35 and 36 will be deënergized. In this way, the switches 34, 35 and 36 will always automatically open as the vehicle is stopped so that they may be regulated each time the vehicle is started to suit the conditions of load existing at that time.

Although I have described the limiting arrangement of my invention in connection with a specific system of control, it is obviously not restricted thereto and may be employed for use with any system of automatic acceleration.

I claim as my invention:

1. The combination with independently operated switches that are adapted to close in a predetermined sequence, of an electromagnetically adjustable, automatic limiting device which retards the operation of said switches.

2. The combination with independently operated switches that are adapted to close in a predetermined sequence, of an electromagnetically adjustable, automatic limiting device which retards the operation of said switches and is dependent upon the value of current flowing from the supply circuit.

3. In a system of electric motor control, the combination with switches that are adapted to close in a predetermined sequence, of a plurality of limit switches which are adapted to operate at different values of electric current and to retard the closure of the said switches.

4. In a system of electric motor control, the combination with switches that are adapted to close in a predetermined sequence, of limit switches which are adapted to operate at different values of electric current and to retard the closure of the said switches, and selective means for determining which of said limit switches shall be included in the circuit.

5. In a system of acceleration for electric motors, the combination of switches which are electrically interlocked so that their closure is confined to a predetermined sequence, of an adjustable limiting device which automatically interrupts the interconnecting control circuits so that the normal sequential operation is delayed.

6. In a control system, the combination with electric motors, resistance in circuit therewith and switches which are adapted to effect suitable circuit connections and to gradually short-circuit said resistance by the closure of said switches in a predetermined sequence, of an adjustable limiting device which automatically interrupts the interconnecting control circuits so that the normal sequential operation is delayed.

7. In a control system for electric motors, the combination with switches, that are provided with auxiliary interlocking contact members which determine the relative position and the sequence of operation of the switches, of a plurality of dissimilar magnet windings that are connected in series relation with the motor circuit and are adapted to open the auxiliary supply circuits when predetermined values of current traverse the motor circuits.

8. The combination with a plurality of independently operated switches that are adapted to close in a predetermined sequence and an automatic, limiting device which retards the operation of the switches, of electro-magnetic controlling and adjusting means for said limiting device.

9. The combination with a plurality of switches that are adapted to close in a predetermined sequence and an automatic, limiting device which retards the operation of the switches, of a controlling and adjusting means for said limiting device that comprises manually operated switches and electro-magnet coils for holding said switches in position when closed.

10. In a control system for electric motors, the combination with independently operated switches that are adapted to close in a predetermined sequence and an automatic, limiting device which retards the operation of the switches and is dependent upon the value of current traversing the motor circuits, of electro-magnetic controlling and adjusting means for said limiting device.

11. In a control system for electric motors, the combination with switches that are adapted to close in a predetermined sequence and an automatic, limiting device which retards the operation of the switches and is dependent upon the value of current traversing the motor circuits, of controlling and adjusting means for said limiting device, that comprises manually operated switches and electro-magnet coils for holding said switches in position when closed.

12. In a system of electric motor control, the combination with switches that are adapted to close in a predetermined sequence, of limit switches which are adapted to operate at different values of electric current and to retard the closure of the switches and selective means for determining which of said limit switches shall be included in the circuit, that comprises manually operated switches and electro-magnet coils for holding said switches in position when closed.

13. In a control system, the combination with a plurality of electric motors, resistance in circuit therewith and switches which are adapted to effect suitable circuit connections and to gradually short-circuit the resistance by the closure of said switches in a predetermined sequence and a limiting device which automatically interrupts the interconnecting control circuits so that the normal sequential operation is delayed, of controlling and adjusting means for said limiting device.

14. In a control system, the combination with a plurality of electric motors, resistance in circuit therewith and switches which are adapted to effect suitable circuit connections and to gradually short-circuit the resistance by the closure of said switches in a predetermined sequence and a limiting device which automatically interrupts the interconnecting control circuits so that the normal sequential operation is delayed, of controlling and adjusting means for said limiting device that comprises manually operating switches and electro-magnet coils for holding said switches in position when closed.

In testimony whereof, I have hereunto subscribed my name this 23rd day of February, 1906.

WILLIAM COOPER.

Witnesses:
HOWARD L. BEACH,
BIRNEY HINES.